US008897552B2

(12) United States Patent
Phillips et al.

(10) Patent No.: US 8,897,552 B2
(45) Date of Patent: Nov. 25, 2014

(54) SETTING AN OPERATING-SYSTEM COLOR USING A PHOTOGRAPH

(75) Inventors: Joshua Phillips, Seattle, WA (US); Simon Baker, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 136 days.

(21) Appl. No.: 13/564,515

(22) Filed: Aug. 1, 2012

(65) Prior Publication Data

US 2014/0037200 A1   Feb. 6, 2014

(51) Int. Cl.
G06K 9/00 (2006.01)
G09G 5/02 (2006.01)
G09G 5/00 (2006.01)

(52) U.S. Cl.
USPC ............................ 382/162; 345/593; 345/619

(58) Field of Classification Search
None
See application file for complete search history.

(56) References Cited

U.S. PATENT DOCUMENTS

| 5,222,154 | A | * | 6/1993 | Graham et al. | 382/162 |
|---|---|---|---|---|---|
| 5,905,492 | A | * | 5/1999 | Straub et al. | 715/744 |
| 6,466,228 | B1 | | 10/2002 | Ulrich et al. | |
| 6,557,017 | B1 | | 4/2003 | Venable | |
| 7,639,394 | B2 | * | 12/2009 | Forbush et al. | 358/1.9 |
| 7,646,392 | B2 | * | 1/2010 | Klassen et al. | 345/593 |
| 7,884,833 | B2 | * | 2/2011 | Klassen et al. | 345/593 |
| 7,920,168 | B2 | | 4/2011 | Craig et al. | |
| 8,041,111 | B1 | | 10/2011 | Wilensky | |
| 8,089,491 | B2 | | 1/2012 | Klassen et al. | |
| 8,264,499 | B1 | * | 9/2012 | Landry et al. | 345/589 |
| 8,508,547 | B2 | * | 8/2013 | Klassen et al. | 345/593 |
| 2003/0231204 | A1 | * | 12/2003 | Hanggie et al. | 345/744 |
| 2004/0056897 | A1 | * | 3/2004 | Ueda | 345/779 |
| 2004/0233209 | A1 | | 11/2004 | Evans et al. | |
| 2005/0039142 | A1 | * | 2/2005 | Jalon et al. | 715/823 |
| 2005/0093880 | A1 | | 5/2005 | Kim | |
| 2006/0066629 | A1 | | 3/2006 | Norlander et al. | |
| 2007/0257933 | A1 | | 11/2007 | Klassen et al. | |
| 2008/0075360 | A1 | * | 3/2008 | Li et al. | 382/155 |
| 2009/0002397 | A1 | * | 1/2009 | Forlines et al. | 345/660 |
| 2011/0029635 | A1 | | 2/2011 | Shkurko et al. | |
| 2011/0299772 | A1 | * | 12/2011 | Janssen | 382/167 |

FOREIGN PATENT DOCUMENTS

EP    1420364    5/2004
WO    WO 2006/003600    1/2006

OTHER PUBLICATIONS

"International Search Report & Written Opinion for PCT Application No. PCT/US2013/052809," Jun. 24, 2014, 14 pages.

* cited by examiner

Primary Examiner — Andrae S Allison
(74) Attorney, Agent, or Firm — Andrew Sanders; Raghu Chinagudabha; Micky Minhas

(57) ABSTRACT

Disclosed herein are representative embodiments of tools and techniques for setting color settings of an operating system using one or more photographs. According to one exemplary technique, a photograph is received, and one or more pixel weights for one or more pixels of the photograph are determined. Also, using at least one of the one or more pixel weights, at least one dominant color of the photograph is determined. Additionally, using the at least one dominant color, at least one color setting of an operating system is set.

19 Claims, 13 Drawing Sheets

FIG. 4
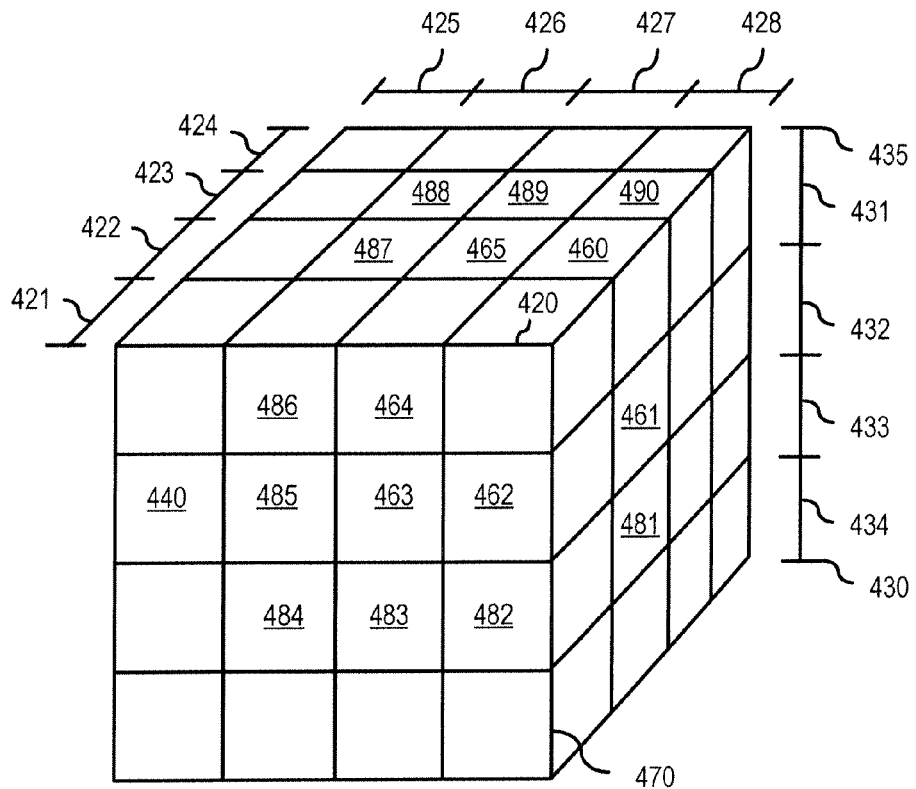
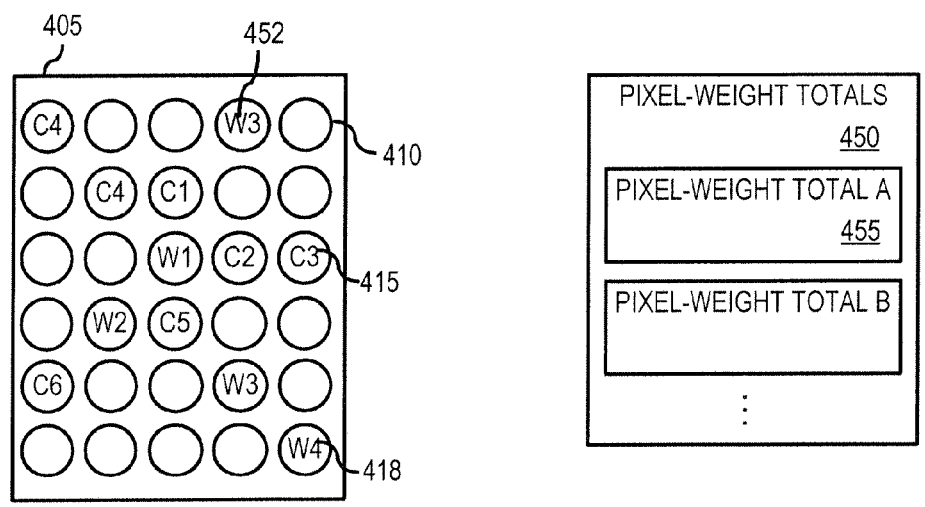

SOFTWARE 1580 IMPLEMENTING DESCRIBED OS COLOR SETTING TECHNOLOGIES

US 8,897,552 B2

SETTING AN OPERATING-SYSTEM COLOR USING A PHOTOGRAPH

BACKGROUND

Various computers incorporate operating systems which have interfaces that are displayable to users. Some traditional operating systems have been displayed using design elements that have been preset. Although these traditional operating systems have had displayable user interfaces, the capabilities of the operating systems have been limited in part due to rigidly preset operating-system designs.

SUMMARY

Among other innovations described herein, this disclosure presents various representative embodiments of tools and techniques for customizing a color displayed by an operating system that is derived using one or more colors of a photograph.

In one embodiment, an operating system application can receive a photograph from outside the operating system. The colors of the pixels of the photograph can be used to determine a set of dominant colors for the photograph. Using the set of dominant colors, the display colors of one or more visual elements of the operating system shell can be set to one or more of the dominant colors of the set of dominant colors.

According to one exemplary technique, a photograph is received, and one or more pixel weights for one or more pixels of the photograph are determined. Using at least one of the one or more pixel weights, at least one dominant color of the photograph is determined. Additionally, using the at least one dominant color, at least one color setting of an operating system is set.

According to another exemplary technique, color values from a photograph provided outside of an operating system are received. Also, a dominant color-range bin of a partitioned color space is determined, and at least one neighboring color-range bin of the dominant color-range bin is determined. Additionally, a dominant color of the photograph is determined using a color within the dominant color-range bin and a color within the at least one neighboring color-range bin. Using at least the at least one dominant color, a color setting of the operating system is set.

According to yet another exemplary technique, a color settings screen of an operating system is displayed, and a photograph selection option is displayed. Also, a photograph is received and pixel weights are determined for pixels of the photograph. At least one dominant color of the photograph is determined, and a luminance of the at least one dominant color is modified to produce at least one refined dominant color. Additionally, one or more color settings of the operating system are set to the at least one refined dominant color, and based on the setting of the one or more color settings, at least one visual element of the operating system is displayed using the at least one refined dominant color.

This summary is provided to introduce a selection of concepts in a simplified form that are further described below. This summary is not intended to identify key features or essential features of the claimed subject matter, nor is it intended to be used to limit the scope of the claimed subject matter. The foregoing and other objects, features, and advantages of the technologies will become more apparent from the following detailed description, which proceeds with reference to the accompanying figures.

BRIEF DESCRIPTION OF THE DRAWINGS

FIG. 4 is a diagram illustrating the exemplary determining of at least one dominant color-range bin of a divided color space.

DETAILED DESCRIPTION

Exemplary System for Setting a Color Setting of an Operating System

Figure 1:
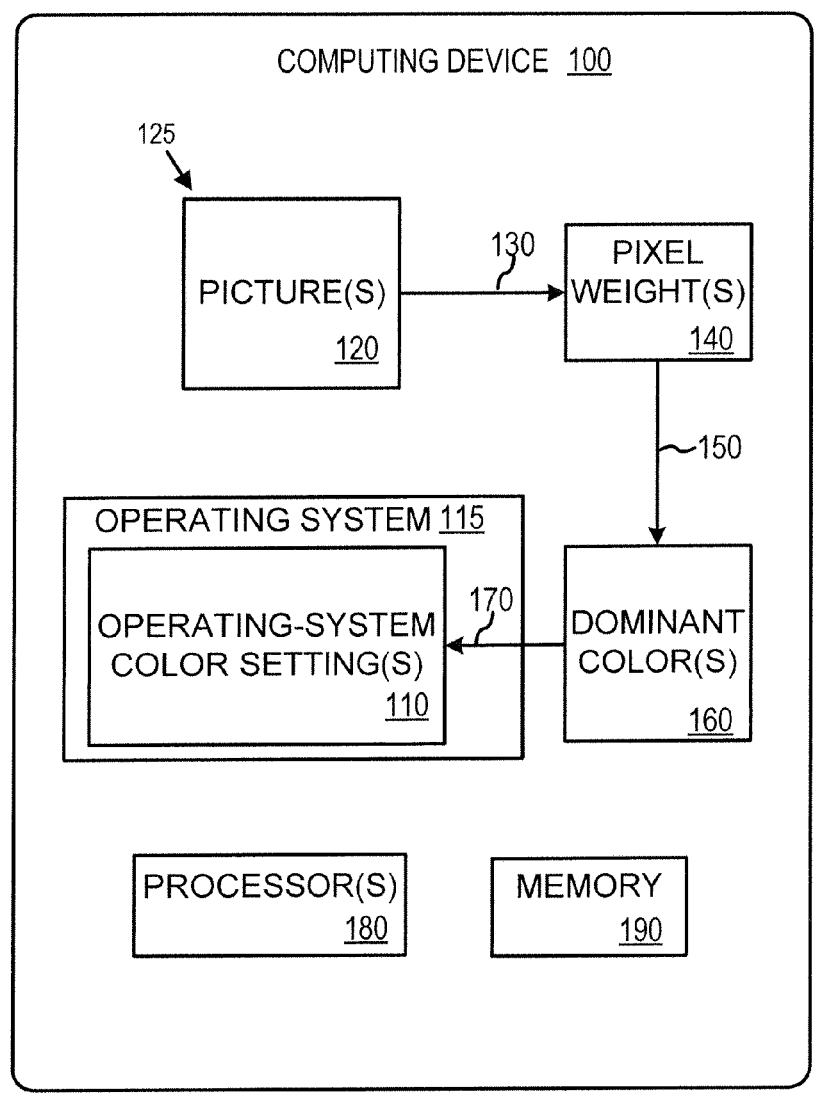
FIG. 1 is a schematic diagram illustrating an exemplary computing device that can set one or more color settings of an operating system at least using one or more photographs.

Customizable features can be desirable in a software platform such as an operating system. For example, a user of a computing device may desire to customize an operating system in part to display a color as shown in or derived from a photograph. FIG. 1 is a schematic diagram illustrating an exemplary computing device 100 that can set one or more color settings 110 of an operating system 115 at least using one or more photographs 120. In the system of FIG. 1, the one or more photographs 120 are received at 125. At 130, one or more pixel weights 140 for one or more pixels of the one or more photographs 120 are determined. For example, the one or more pixel weights 140 can be assigned to and/or associated with the one or more pixels of the one or more photographs 120. At 150, one or more dominant colors 160 of the one or more photographs 120 are determined using at least one of the one or more pixel weights 140. At 170, the one or more color settings 110 of the operating system 115 are set using at least one of the one or more dominant colors 160. For example, a color setting of a visual element of an operating system shell or displayable user interface (e.g., a graphical user interface) can be set to the at least one dominant color. In an exemplary implementation, theme settings of an operating system can determine a theme which maintains a look and feel for various displayed screens and/or images of the OS, and a color of the theme can be set (e.g., via a color setting) to the determined dominant color in order to set a part of the look and feel of the OS. The computing device 100 of FIG. 1 also includes one or more processors 180 and memory 190.

Exemplary Method for Setting a Color Setting of an Operating System

Figure 2:
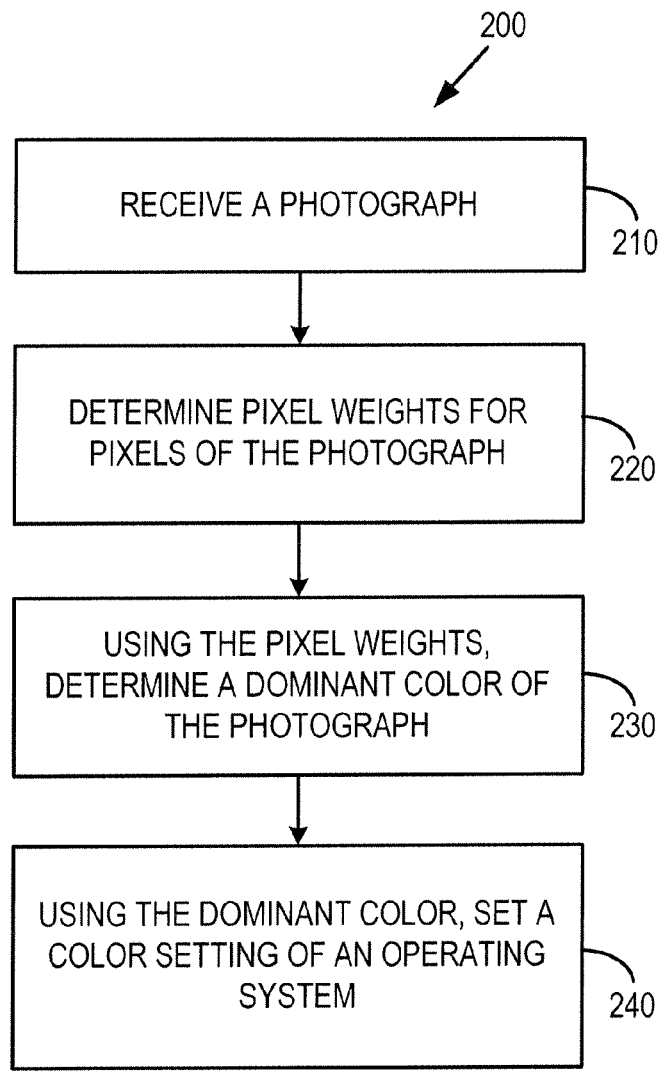
FIG. 2 is a flowchart of an exemplary method for setting a color setting of an operating system at least using one or more photographs.

FIG. 2 is a flowchart of an exemplary method 200 for setting a color setting of an operating system (OS) at least using one or more photographs. In FIG. 2, a photograph is received at 210. For example, a photograph can be received by an OS from a camera or an application on a device. In some examples a photograph can be a digital photograph that can include one or more pixels, and the respective pixels of the photograph can be of one or more respective colors. In some implementations, the photograph can be a digital image.

At 220, one or more pixel weights for one or more pixels of the photograph are determined. For example, an algorithm and/or function can be used to determine weights for pixels. In some implementations, before pixel weights are determined for the photograph, the received photograph can be downsampled such that there are fewer pixels in the downsampled photograph than in the photograph before it was downsampled. In other implementations, the photograph is not downsampled before pixel weights are determined for the photograph. In some implementations, weights can be determined for pixels using a weighting technique and/or function that produce a pixel weight based on a distance from a particular location in the photograph. For example, the particular location in the photograph can be predetermined (e.g., the center of the image) or selected (e.g., selected by receiving a user selection).

In some implementations, a pixel's weight can be based on a measured distance the pixel is from the particular location in the photograph. For example, the pixels can be weighted such that pixels that are a farther distance away from the particular location in the photograph are weighted less than at least some pixels that are a closer distance to the particular location in the photograph. In some implementations, a particular location in the photograph can be a pixel or a group of pixels, or an area or position of the photograph designated using a coordinate system or other measurement system. In some implementations, a particular location in the photograph can be a region of the photograph and the region can be predetermined (e.g., a central region) or selected (e.g., selected by receiving a user selection). For example, a user can use a user interface to select a particular location in the photograph. The particular location of the photograph can be a region of pixels in the photograph that can be used to determine the pixel weights of the photograph. The region of the photograph can be a shape such as a circle, a rectangle, a polygon, an asymmetrical shape, or other shape. Pixel weights can be within a range of values (e.g., a range from 0-1) and the values can include fractional values. In some implementations, weights of pixels can be assigned using a formula that assigns a weight of 1 to one or more pixels at the particular location in photograph, and that assigns a weight of zero to one or more pixels located on at least one edge of the photograph (e.g., at a furthest distance in the photograph from the particular location) or at least one edge of a selected area of the photograph. The formula can also assign weights that range from 1 to zero (e.g., a range that includes fractional weights) for pixels between the location and the edge such that the weights decrease for pixels that are further away from the particular location. The distance between a pixel and the particular location in the photograph can be determined or measured using a Euclidean distance measure using a coordinate system of the photograph or measured using a count of pixels or fractions of pixels between the particular location and the pixel to be weighted.

At 230, at least one dominant color of the photograph is determined using at least one of the one or more pixel weights. For example, a color space can be divided into color-range bins and the pixels of the photograph can be associated with color-range bins based on the colors of the pixels. In an exemplary implementation, a pixel of a color within a color-range bin can be within and/or associated with that color-range bin. For the respective color-range bins, the weights of pixels with colors within a respective color-range bin can be added or summed to determine a pixel-weight total for the respective color-range bin. By adding the weights of pixels within color-range bins, the pixels (e.g., each pixel) of the photograph can vote for a color-range bin to determine a dominant color-range bin. The pixel-weights of respective color-range bins can be compared to determine a highest pixel-weight total and its associated color-range bin. The color-range bin with the highest pixel-weight total of the pixel-weights compared can be a dominant color-range bin. Once a dominant color-range bin is selected, a dominant color is determined using colors from pixels with colors within the dominant color-range bin. In some implementations, the color values of pixels with colors that are within the dominant color-range bin can be averaged, and the averaged color of the pixels can be chosen as the dominant color for the color-range bin. In some implementations, a dominant color is determined using colors from pixels with colors within the dominant color-range bin and one or more color-range bins that neighbor and/or are near the dominant color-range bin. In some implementations, once the dominant color is determined the dominant color can be saved and used for personalization or customization of colors of the OS. In some implementations, a pixel can vote for the color-range bin that its color lies within as well as some neighboring or nearby color-range bins (e.g., neighboring color-range bins within a small distance). For example, the weight of a pixel with a color within a color-range bin can be added to the pixel-weight total for the color-range bin and also added to pixel-weight totals of one or more neighboring color-range bins. The pixel weight for the pixel can be added to pixel-weight totals of neighboring color-range bins in whole or in part. For example, the pixel weight when added to neighboring color-range bins can drop off or be incrementally lowered based on the distance the neighboring color-range bins are away from the color-range bin that includes the color of the pixel. When added to the neighboring color-range bins, the pixel weight can be lowered for further away neighboring color-range bins. In some implementations, a dominant color is determined using pixels from an area (e.g., a selected or predetermined area) of the photograph instead of the pixels from the whole photograph.

At 240, at least one color setting of an OS is set using the at least one dominant color. For example, a color setting of an element of an operating systems shell or displayable user interface (e.g., a graphical user interface) can be set to the at least one dominant color, so that the element of the OS when displayed is displayed as colored, at least in part, using the dominant color. In some implementations, a color setting of an operating system can set a color for a theme color, an accent color, or a visual element of the OS can be set to be displayed in part as the dominant color. In some implementations, the dominant color can be refined and the at least one color setting of the OS is set using the refined dominant color. In some implementations, the dominant color can be refined based on user preferences. For example, once the dominant color is determined, a user interface can be displayed allowing a user to change and/or customize color values of the dominant color to produce a refined dominant color. In another implementation, the dominant color can be refined automatically. For example, the dominant color can be refined to adjust a contrast of the color with other colors that may be displayed by the OS or computing system. In some implementations, the dominant color can be changed or refined by brightening or darkening the dominant color. For example a luminance of the dominant color can be changed. In some implementations, a luminance value of the dominant color can be increased to brighten the dominant color to the refined dominant color. In other implementations, a luminance value of the dominant color can be decreased to darken the dominant color to the refined dominant color. In some implementations, a color wheel can be used to automatically choose one or more colors that are complimentary to the dominant color, and the chosen complimentary colors can also be used to set one or more color settings of an OS. For example, a visual element of the OS can be set to be displayed as the dominant color and another visual element of the OS can be set to be displayed as a complimentary color to the dominant color based on complementary colors (e.g., complementary colors as indicated using a color wheel).

Exemplary Method for Setting a Color Setting of an Operating System

Figure 3:
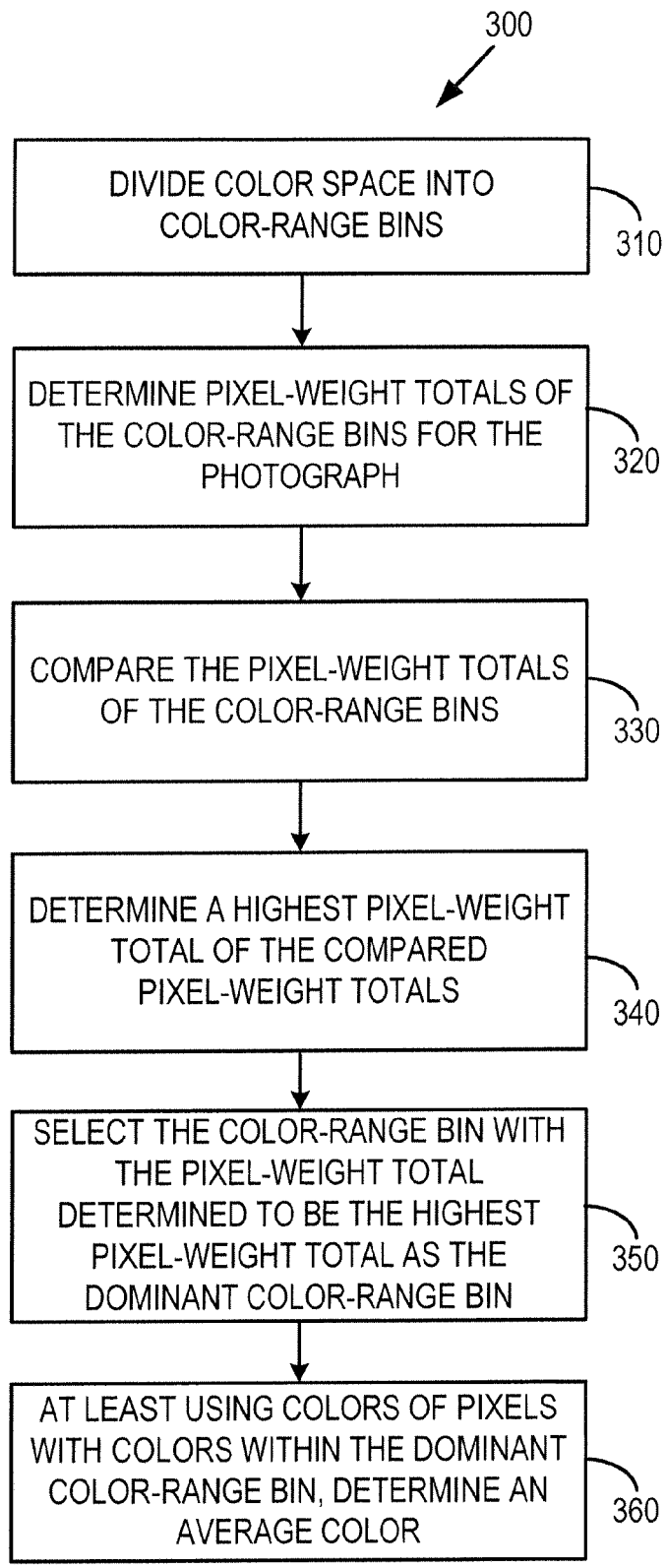
FIG. 3 is a flowchart of an exemplary method of determining at least one dominant color of a photograph.

FIG. 3 is a flowchart of an exemplary method 300 of determining a dominant color of a photograph. In FIG. 3, a color-space is divided into a plurality of color-range bins at 310. For example, a color space can represent a set of colors. A color of the color space can be represented using color values. In some implementations, a color space can be an RGB color space where the colors of the color space are represented using a tuple of values for a red, a green, and a blue dimension of the color space. In another implementation, a color space can be a YUV color space where the colors of the color space are represented using a tuple of values for a hue dimension, a saturation dimension, and a luminance dimension. A color space can be divided into segments or color-range bins. A color space can have color dimensions such as an RGB color space can have red, green and blue dimensions. For an RGB color space the color values of the color dimensions can be within a range (e.g., from 0 to 255 where pixels can be represented using 8 bits, or other range). Each color dimension of a color space can be divided into a number of color ranges. For example, for an RGB color space each of the red, green and blue dimensions can be divided into a number of color ranges (e.g., divided into 2, 4, 8, 16, 32, or 64, 128 color ranges) with respective color ranges including a number of consecutive color values along the dimensions range. In an exemplary implementation, for a RGB color space with color dimensions with color values that range from 0 to 255, the dimensions of the color space can be divided into 16 color ranges per dimension that include 16 consecutive color values per color range. In other implementations, the dimensions of an RGB color space can be divided using more or fewer color ranges with more or more consecutive color values per color range.

A color-range bin can be designated such that it includes a group of colors that can be represented using combinations of values from color ranges from each of the red, green, and blue dimensions of the divided color space. For example, a color-range bin can include colors that can be generated using a tuple that includes color values that are within a red dimension color range, a green dimension color range, and a blue dimension color range. For example, a RGB color space that is divided into 16 color ranges per color dimension can include a color-range bin that is designated to include the colors that can be generated using red dimension color range values of 0-15, green dimension color range values of 32-47, and blue dimension color range values of 64-79. Other color-range bins of the divided color space can be designated using other combinations of color range values of the color dimensions of the divided color space. An RGB color space that is divided into 16 color ranges per color dimension can be divided to include 4,096 color-range bins (e.g., 16 red dimension color ranges×16 green dimension color ranges×16 blue dimension color ranges).

With reference to FIG. 3, one or more pixel-weight totals of the color-range bins are determined for the photograph at 320. For example, a color-range bin can be associated with a pixel-weight total which can be determined by summing the weights of pixels in the photograph that have colors within the color-range bin. In some implementations, pixel-weight totals, for the photograph, are determined for each of the color-range bins of the divided color space.

At 330, at least two of the pixel-weight totals of the color-range bins are compared. For example, a pixel-weight total can be compared to another pixel-weight total to determine which pixel-weight total has a greater or lesser value. In some implementations, each of the pixel-weight totals of the color-range bins are compared. In other implementations, pixel-weight totals of a subset of the pixel-weight totals of the color-range bins are compared. For example, some of the pixel-weight totals of color-range bins can be selected and excluded from comparison.

At 340, a highest pixel-weight total of the compared pixel-weight totals is determined. For example, the pixel-weight totals can be compared and the pixel-weight total with the highest value can be found using the comparisons.

At 350, the color-range bin with the pixel-weight total determined to be the highest pixel-weight total is selected as the dominant color-range bin. For example, the color-range bin that includes colors of pixels that produce the highest or maximum pixel-weight total for the photograph can be used as a dominant color-range bin.

At 360, an average color is determined at least using colors of pixels with colors within the dominant color-range bin. For example, for the photograph or an area of the photograph, color values of the pixels with colors within the dominant color-range bin and/or one or more neighboring color-range bins are averaged, and the averaged color values can be used for the color values of the at least one dominant color of the photograph. In some implementations, for an RGB color space, the color values that can be averaged can be respective values from a tuple for the respective red, green and blue color dimensions of the color space that are used to indicate color. The respective tuple values for the respective color dimensions can be averaged to determine a tuple for an average color that can be the determined dominant color for the photograph. For example, tuple values for a first color in an RGB color space can be (R1, G1, B1) and tuple values for a second color in the RGB color space can be (R2, G2, B2). The tuple values R1 and R2 can be respective tuple values for the red dimension, the tuple values G1 and G2 can be respective tuple values for the green dimension, and the tuple values B1 and B2 can be respective tuple values for the blue dimension. The red dimension values of the first and second colors can be averaged and the averaged value can be the tuple value for the red dimension component of the tuple for the average color. The average of the green dimension values of the first and second colors can be the tuple value for the green dimension component of the tuple for the average color. Also, the average of the blue dimension values of the first and second colors can be the tuple value for the blue dimension component of the tuple of the average color. In some implementations, the colors of more than two pixels are averaged to determine the dominant color. For example, the colors from pixels with colors within the dominant and/or neighboring color-range bins can be used (e.g., averaged) to determine a dominant color-range bin. In some implementations, instead of finding an average of pixel colors, colors of pixels within a dominant color-range bin and/or neighboring bins are used to find a median or mode of the pixel colors which can be used as a dominant color for the photograph.

Exemplary Selection of a Dominant Color-Range Bin

FIG. 4 is a diagram illustrating the selection of at least one dominant color-range bin. In FIG. 4, a photograph 405 includes one or more pixels such as pixel 410. Respective pixels can have respective colors, such as color 415. A color of a pixel can be described using a tuple of color values of a color space such as a YUV color space or an RGB color space. Also pixel weights, such as pixel weight 418, can be assigned to respective pixels of the photograph 405. As shown in FIG. 4, a color space is divided into 16 segments or color-range bins such as color-range bin 420. The RGB color space shown in FIG. 4 has its respective color dimensions (e.g., the red, green, and blue dimensions) divided into four color ranges. For example, the red dimension is divided into four ranges 421-424, the green dimension is divided into four ranges 425-428, and the blue dimension is divided into four ranges 431-434. The respective color dimensions of the color space can range from 0-255. For example, the blue dimension of the color space can range from 0 as shown at 435 to 255 as shown at 435. A color-range bin can represent a group of colors within the color space. The colors within a color-range bin can be the colors represented by color values within the ranges of the color dimensions set for the color-range bin. For example, color-range bin 420 can include one or more colors that are within the red color range 421, the green color range 428, and the blue color range 431.

As shown in FIG. 4, pixel-weight totals 450 are determined for respective color-range bins of the divided color space. The pixel-weight totals are generated at least by summing up the pixel weights of pixels in the photograph that have colors that are within respective color-range bins. For example, the pixel 410 of photograph 405 is scanned and its color values are evaluated and the color values are such that the color of pixel 410 is within the color-range bin 440. Then the pixel weight for pixel 410 is added to the pixel-weight total 452 for color-range bin 440. After the pixels of photograph 405 have been scanned and the pixel-weight totals 450 have been determined, the respective pixel-weight totals of the pixel-weight totals 450 are compared to determine that color-range bin 420 has a highest pixel-weight total 455 of the pixel-weight totals 450 making the color-range bin 420 a dominant color-range bin.

As shown in FIG. 4, after color-range bin 420 is determined to be a dominant color-range bin, another dominant color-range bin 470 is determined at least by eliminating the pixel-weight totals of the identified dominant color-range bin 420 some of its neighboring color-range bins from consideration or comparison in determining a highest pixel-weight total of the next set of pixel-weight totals compared. The second dominant color-range bin 470 for photograph 405 is determined at least by comparing respective pixel-weight totals to other pixel-weight totals from a set of pixel-weight totals for respective color-range bins that are not dominant color-range bins such as color-range bin 420 or the selected neighboring color-range bins of a dominant color-range bin. In FIG. 4, the selected neighboring color-range bins to be excluded in the determining of a second color-range bin include color-range bins 460-465. In some implementations, neighboring color-range bins to be excluded from consideration for determining a dominant color can be above, below, left of, right of, in front of, behind, or diagonal to (e.g., at a corner of, or edge of) the dominant color-range bin as represented in the three dimensional representation of the color space shown in FIG. 4. In some implementations, neighboring color-range bins can be selected or predetermined such that they are within one or more levels of neighboring color-range bins away from the dominant color-range bin. To determine a level or a distance a color-range bin is away from another color-range bin, a distance measure can be used. For example, a Euclidean distance between color-range bins can be used, a count of color-range bins between color-range bins can be used, or other like distance measures can be used. In some implementations, the neighboring color-range bins within a predetermined or a selected distance away from a dominant color range bin and the dominant color range bin can be excluded from consideration for determining another dominant color-range bin. For example, as shown in FIG. 4, the selected neighboring color-range bins to be excluded in the determining of a second color-range bin can include color-range bins 460-465 and color-range bins 481-490 as well as other neighboring color-range bins.

Exemplary Method for Setting a Color Setting of an OS Using a Color-Range Bin

Figure 5:
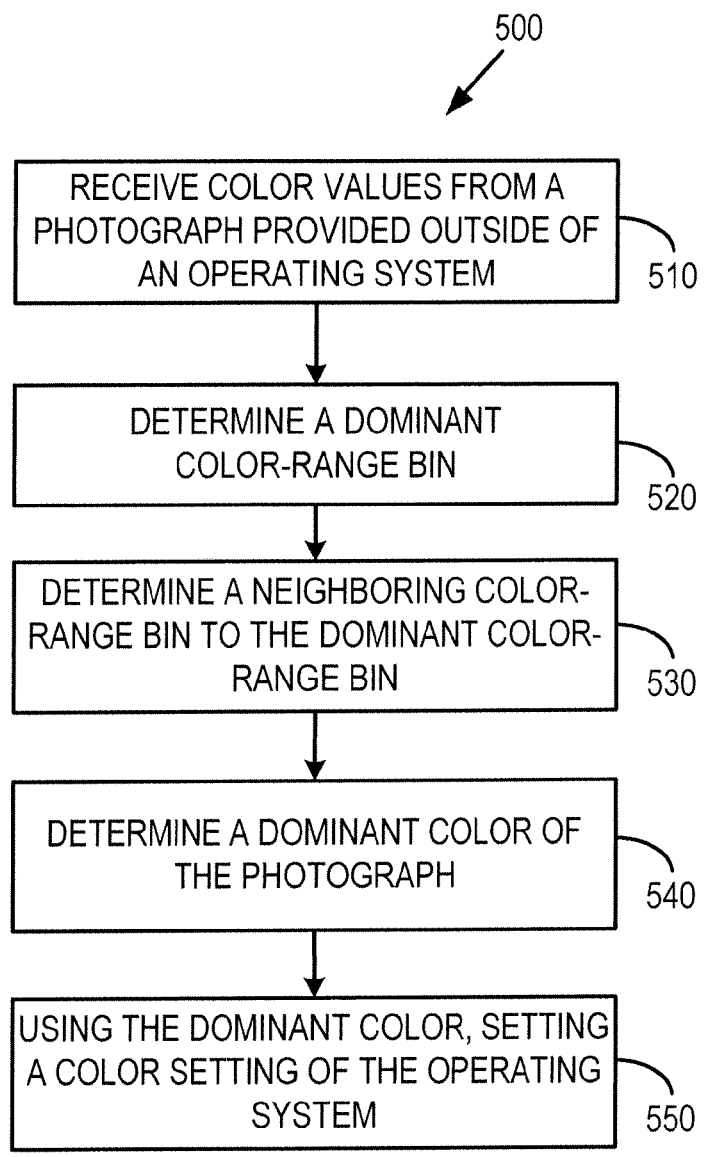
FIG. 5 is a flowchart of an exemplary method for setting a color setting of an operating system using at least one dominant color-range bin.

FIG. 5 is a flowchart of an exemplary method 500 for setting a color setting of an operating system (OS) using at least one dominant color-range bin. In FIG. 5, one or more color values from a photograph that is provided outside of an OS are received at 510. For example, a photograph or color values for one or more pixels within the photograph can be received by the OS from an application or camera that is not a part of the OS.

At 520, a dominant color-range bin of a partitioned color space is determined. For example, a color space can be divided into color-range bins and the pixels of the photograph can be used to determine a dominant color-range bin. In some implementations, a color space is divided into a plurality of color-range bins. A color-range bin can designate a group of colors that are within the color-range bin. A color-range bin can be designated using ranges of color dimensions of the color space.

In some implementations, for the respective color-range bins, the weights of one or more pixels, of the photograph, with colors within the respective color-range bin can be summed to determine a pixel-weight total for the respective color-range bin. For example, each pixel of the photograph or a designated area of the photograph can be evaluated and the weights can be added to pixel-weight totals for respective color-range bins. In some implementations, a pixel-weight total can be initialized to begin at a predetermined value. For example, before any pixel-weights are added to the respective pixel-weight totals for the respective color-range bins, the respective pixel-weight totals can be set to a predetermined original value (e.g., set to zero, or some other original value). After the pixels of the photograph (e.g., each pixel of the photograph) are evaluated and the pixel weight-totals are completed, a comparison can be done between the pixel-weight totals to determine which pixel-weight total has a highest value of the compared pixel-weight totals. The color-range bin that has the pixel-weight total determined to be the highest value pixel-weight total can be selected and/or set as the dominant color-range bin.

In some implementations, more than one dominant color-range bin can be determined using the photograph. For example, the dominant colors can be determined by iteratively determining dominant color-range bins and determining the dominant colors based at least on the determined color-range bins. For example, after one or more dominant color-range bins are selected, the one or more dominant color-range bins and/or selected neighboring color-range bins and their respective pixel-weight totals can be excluded from a comparison of the remaining (e.g., not excluded) pixel-weight totals in determining a highest value pixel-weight total among the group of compared pixel-weight totals. In some implementations, the neighboring color-range bins within a predetermined or a selected distance away from a dominant color range bin and the dominant color range bin can be selected to be excluded from consideration for determining another dominant color-range bin. The color-range bin with the highest value pixel-weight total of the remaining pixel-weight totals can be another dominant color of the photograph. In some implementations, excluding pixel-weight totals for dominant color-range bins and their neighboring color-range bins allows for finding various dominant colors of the photograph that are different and from different areas of the color space. For example, for a particular photograph, a first dominant color can be determined to be a red color of the photograph within a first color-range bin, and a second dominant color can be determined to be a blue color of the photograph within a second color-range bin that is in a different area of the color space than the first color-range bin. In some implementations, a distance of a number of neighboring color-range bins from the dominant color-range bin can be set to determine how many near or neighboring color-range bins are to be excluded when determining a subsequent dominant color for the photograph.

At 530, at least one neighboring color-range bin of the dominant color-range bin is determined. For example, the color ranges of one or more of the color-range bins of the divided color space are evaluated to determine if the one or more color-range bins are near or neighbor the dominant color-range bin. For example, a color-range bin can be near or neighbor another color-range bin in a divided color space if the neighboring color-range bin has at least two color ranges that are the same or adjacent to one or more color ranges for the dominant color-range bin or another neighboring color-range bin. In some implementations, the color range for a color-range bin and the color range for its neighboring color-range bin are consecutive color ranges of a color dimension that is divided into color ranges. For example, for a RGB color space, a red dimension of the color space can have values that range from 0-255, and the values of the red dimension can be divided into 16 color ranges that include 16 values for each range. If a color-range bin has a color range for the red dimension with values of 16-31, a neighboring color-range bin can have a color range for the red dimension that has values of 32-47, which can be an adjacent color range to the color range with values 16-31. Also, another neighboring color-range bin can have a color range for the red dimension that has a value range 0-15 as an adjacent color range to the color range with values 16-31. In some implementations, neighboring color-range bins can have different color ranges in the red dimension.

In some implementations, near or neighboring color-range bins can include color-range bins that are adjacent to or are neighboring other neighboring color-range bins. For example, neighboring color-range bins can have color ranges that are the same or adjacent (e.g., consecutive to) color ranges for neighboring color-range bins. In an exemplary implementation, a selected color-range bin can have a color range for the green dimension with values 0-15, the selected color-range bin can have neighboring color-range bins that have respective color ranges for the green dimension that are a number of consecutive value ranges from the value range of the selected color-range bin. For example, neighboring color-range bins can have respective color ranges for the green dimension that have value ranges from 16-31 and/or 32-47. The color-range bin with the green dimension value range of 16-31 can be one color range away from the selected color-range bin. Also, the color-range bin with the green dimension value range of 32-47 can be two color ranges away from the selected color-range bin because there is one green color range between its green color range and the green color range of the selected color-range bin. In some implementations, a number of color ranges can be set or determined to designate how many color ranges away a color-range bin can be to a selected color-range bin (e.g., a dominant color range bin) to designate which color-range bins are near or neighboring to the selected color-range bin.

At 540, at least one dominant color of the photograph is determined at least using a color within the dominant color-range bin and a color within the at least one neighboring color-range bin. For example, the colors of one or more of the pixels with colors within the dominant color-range bin and the colors of one or more of the pixels with colors within the at least one neighboring color-range bin can be used to determine the at least one dominant color. In some implementations, for the photograph or an area of the photograph, the color values of the pixels with colors within the dominant color-range bin and one or more neighboring color-range bins are averaged and the averaged color values can produce the at least one dominant color of the photograph.

At 550, at least one color setting of the OS is set using at least the one dominant color. For example, a theme color, an accent color, or other visual element of the OS can be set to be displayed in part as the dominant color or dominant color that has been refined. In some implementations, visual elements of an OS include, elements of an instant messaging tool, elements of a text messaging tool, elements of a personal profile, a text color, a background, an icon (e.g., a tile icon), highlighting of text, a window, a menu, a list, a task bar, a title bar, an application background, a button, a hyperlink, a message box, a scroll bar, a selected item, an OS shell component, or other visual elements of an OS.

In some implementations, the OS accepts color values from a data source not provided by or predetermined for the OS. For example, the dominant color can be determined using an application or other software on a computing device and the OS accepts the color values of the application to set the at least one color setting of the OS.

Exemplary System for Displaying Visual Elements of an OS Using a Dominant Color

Figure 6:
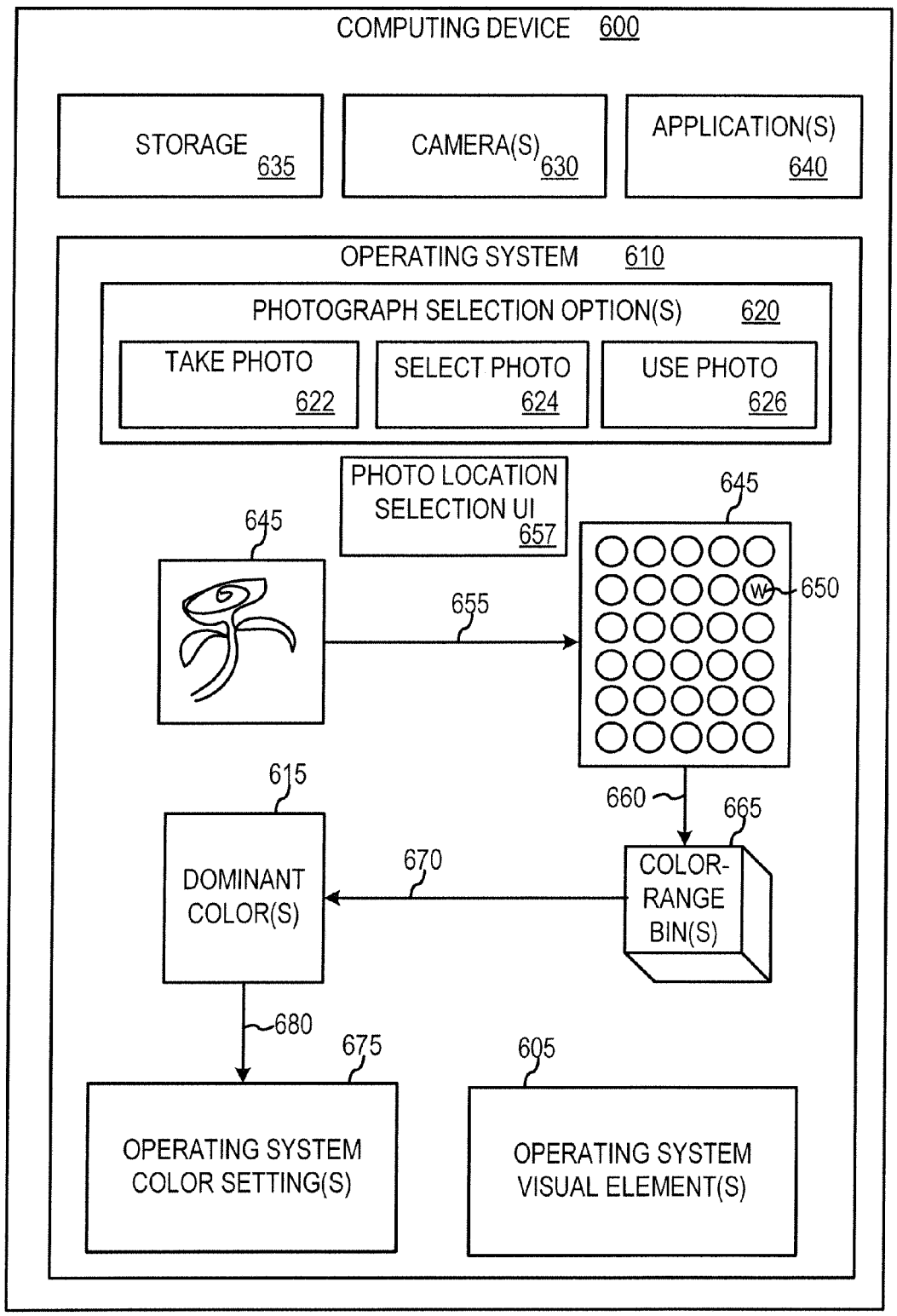
FIG. 6 is a schematic diagraph illustrating an exemplary computing device for displaying an operating system element using a dominant color.

FIG. 6 is a schematic diagram illustrating an exemplary computing device 600 for displaying one or more visual elements 605 of on operating system 610 using one or more dominant colors 615. The computing device can provide a user interface for displaying one or more photograph selection options 620. The photograph selection options 620 include an option to take a photograph 622, an option to select a photograph 624, and an option to use a current photograph 626. A user can select the take photograph option 622 to take a photograph using a camera of the one or more cameras 630 and/or using a camera application of the one or more applications 640. A user can select the select photograph option 624 to select a photograph from a group of photographs stored in storage 635 or from an application of the one or more applications 640. A user can select the option to use a current photograph 626 to use a currently displayed or selected photograph.

The operating system 610 can receive the photograph 645, and one or more weights, such as weight 650, can be assigned to one or more pixels (e.g., each pixel) of photograph 645 as shown at 655. A particular location (e.g., a position, a pixel, or a region) of the photograph 645 can be selected using the user interface 657 for photograph location selection and the selected location can be received and used to determine the one or more pixel weights to assign to the one or more pixels of the photograph 645. The pixels of the photograph 645 can use the one or more weights to vote for one or more color-range bins 665 to determine one or more dominant color-range bins as shown at 660. Using the one or more dominant color-range bins, one or more dominant colors 615 are determined as shown at 670. Using at least the one or more dominant colors 615, one or more color settings 675 of the operating system 610 can be set as shown at 680. The one or more visual elements 605 of the operating system 610 can be displayed by the computing device 600 using at least the one or more dominant colors 615 or refinements of the dominant colors 615.

Exemplary Method of Displaying a Visual Element Using a Refined Dominant Color

Figure 7:
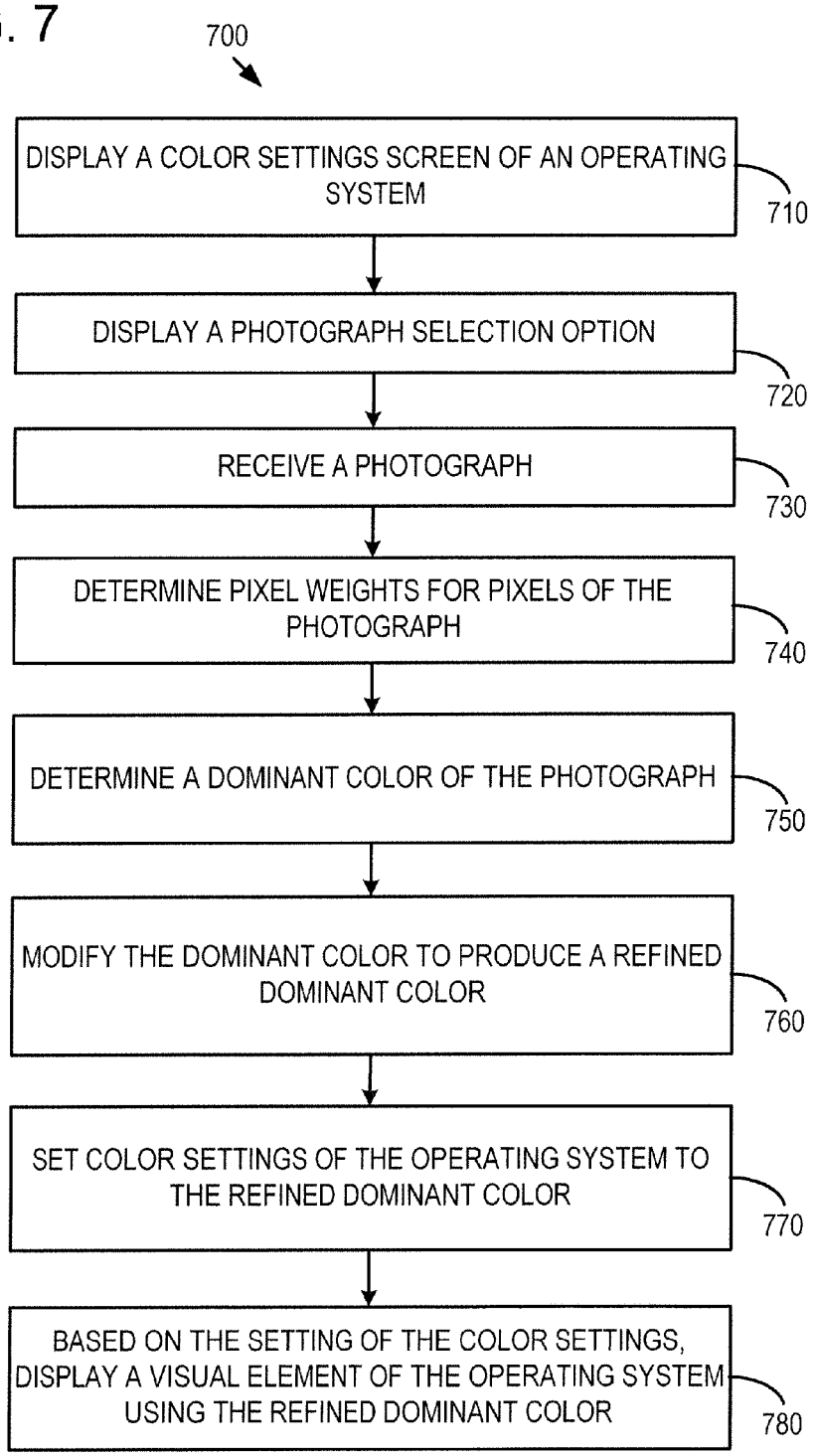
FIG. 7 is a flowchart of an exemplary method for displaying a visual element of an operating system using a refined dominant color.

FIG. 7 is a flowchart of an exemplary method 700 for displaying a visual element of an operating system (OS) using a refined dominant color. In FIG. 7, a color settings screen of an OS is displayed at 710. For example, a user interface (UI) for setting a color setting of an OS can be displayed, in the display of a computing device, for a user. In some implementations the user interface can be a theme control panel, a settings screen, a window or menu for setting a color of an operating system, or other UI.

At 720, a photograph selection option is displayed. For example, in the user interface one or more options can be displayed for a user to select. The one or more options can include an option to select a photograph, an option to take a photograph or an option to use a current photograph. For example, a user can open a theme or accent color settings screen and see an option to grab or extract colors from a stored photograph or a photograph to be taken by a camera and/or from a camera application. In some implementations, a displayed option is selected and the selection of the option is received by the operating system. For example, a user of the computing device selects at least one of the options using a selection method of the user interface and the selection is receive by the OS. If the option to select a photograph is selected, a photograph can be selected from a group of photographs. In some implementations, the photographs are stored on the device or stored remotely such as online (e.g., on a website) or in a cloud storage (e.g., on a remote computer storage). If the option to take a photograph is selected, the selection can be received by the OS and a photograph can be taken by a camera and/or camera application of the computing device and selected for use. If the option to use a current photograph is selected, the selection can be received by the OS and a currently active, displayed or selected photograph can be selected for use in setting OS color settings.

At 730, a photograph is received. For example, a photograph selected using a user interface for setting a color setting of an OS can be received by the OS. The photograph can be received from storage, from a local application (e.g., an email application, text messaging application, photograph application, web browsing application, or other installed application), a web application, the internet (e.g., a website or other internet site), or a camera of the computing device.

At 740, one or more pixel weights for one or more pixels of the photograph are determined. For example, one or more of the pixels of a received photograph can be associated with a weight based on a distance the respective pixels are from a location in the photograph. In some implementations, the location is a predetermined location such as the center of the photograph, the center of an area of the photograph, a focus point of the photograph, or other location in the photograph set as the predetermined location. In some implementations, the location can be a selected location. For example, a user can select a location in the photograph through a user interface and the selected location can be received by the OS for use in determining pixel weights. In an exemplary implementation, the photograph can be displayed and a user can select a location in the photograph to be set as the location for determining pixel weights for the photograph. For example, a user can use a user interface to select a location such as a position, one or more pixels, or a region (e.g., a rectangle or other shape), of the photograph that can be used to determine pixel weights for pixels of the photograph.

At 750, at least one dominant color of the photograph is determined. For example, a dominant color is determine using colors of pixels with colors from a dominant color-range bin and/or one or more neighboring color-range bins of a divided color space. In some implementations, a number of dominant colors can be extracted or determined from the photograph based on a selected or predetermined number of requested dominant colors. For example, an operating system can have predetermined number of dominant colors to extract, or the operating system can receive a selection (e.g., selected by a user of the computing device) for a number of dominant colors to extract.

At 760, at least one dominant color is modified to produce at least one refined dominant color. In some implementations, a dominant color can be modified or refined by changing the dominant color to a new color that can be the refined dominant color. In other implementations, the dominant color is not changed and the dominant color can be the refined dominant color. In some implementations, a user of a computing device can change or customize the dominant color (e.g., using a provided UI). For example, a user can brighten or darken the dominant color, or otherwise customize the dominant color.

In some implementations, a dominant color can be refined automatically. For example, the dominant color can be brightened or darkened by automatically changing a luminance of the dominant color. A dominant color can be refined automatically based on or to fit an acceptable contrast. For example, one or more acceptable contrast ratios or an acceptable contrast ratio range can be predetermined for one or more theme colors, accent colors, or other visual elements of the OS. If a dominant color is determined, a contrast ratio can be determined for the dominant color. For example, a contrast ratio can be determined between the dominant color and a color that is to be displayed over, near, or adjacent to the visual element that is to be set using the dominant color or refined dominant color.

The determined contrast ratio can be compared to the predetermined contrast ratio or contrast ratio range for the visual element to determine if the determined contrast ratio is an acceptable contrast ratio (e.g., within a predetermined contrast ratio range or threshold or matching a predetermined acceptable contrast ratio). If the comparison determines that the contrast ratio is not an acceptable contrast ratio, the dominant color is refined (e.g., changed) such that the refined dominant color has an acceptable contrast ratio. In some implementations, the dominant color is automatically brightened or darkened to provide an acceptable contrast (e.g., to produce an acceptable contrast ratio) by changing a luminance of the dominant color. An RGB color space representation of a dominant color can be converted or mapped to a YUV color space representation of the dominant color, and the luminance value of the YUV tuple can be increased or decreased to change the dominant color into a refined dominant color with an acceptable contrast. In some implementations, once the luminance value is set in the YUV color space for the refined dominant color, the YUV color space representation of the refined dominant color can be converted or mapped back to the RGB color space representation of the refined dominant color. In some implementations, the operating system can set color settings using an RGB representation of a dominant or refined dominant color or a YUV representation of a dominant or refined dominant color.

At 770, one or more color settings of the OS are set to the refined dominant color. For example, an OS setting for a theme color, an accent color, or a color of a visual element of the OS can be set to the refined dominant color to be displayed as colored, at least in part, as the refined dominant color.

At 780, at least one visual element of the OS using the refined dominant color is displayed based at least on the setting of the one or more color settings. For example, a visual element such as an application icon or application tile of the OS can be set using OS color settings to be colored in part as the refined dominant color and displayed, in a display of the computing device because the color setting was set to the refined dominant color.

Exemplary Modification of the Luminance of a Color

Figure 8:
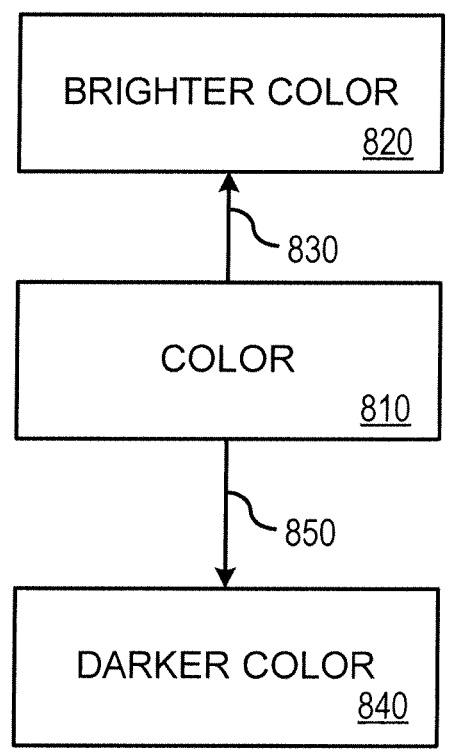
FIG. 8 is a diagram illustrating an exemplary modification of a luminance of a color.

FIG. 8 is a diagram illustrating the modification of a luminance of a color. In FIG. 8, the color 810 is changed (e.g., brightened) to a brighter color 820 by increasing a luminance value of the color 810 at 830. Also, in FIG. 8, the color 810 is changed (e.g., darkened) to a darker color 840 by decreasing a luminance value of the color 810 at 850. In some implementations a luminance value of a YUV space representation of a color can be within a range (e.g., 0-240).

Exemplary Visual Elements of an Operating System

Figure 9:
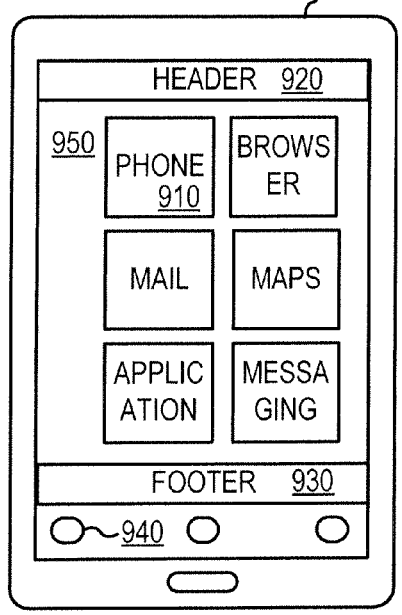
FIG. 9 is a diagram of an exemplary mobile device displaying various visual elements of a mobile device operating system.

FIG. 9 is a diagram of an exemplary mobile device 900 displaying various visual elements of a mobile device OS that can be set (e.g., via the mobile device OS settings) to be displayed using a dominant or refined dominant color determined from a photograph as described by any of the examples herein. In FIG. 9, the displayed visual elements of the mobile device OS include an application tile 910, a header 920, a footer 930, a visual button 940, and a background 950. As shown, the mobile device 900 displays application icons or tiles for one or more applications such as the application tile 910 for a phone application of the OS. The mobile device 900 also displays the header 920 near the top of the display and the footer near the bottom of the display. The mobile device 900 displays buttons for one or more OS functionalities such as the visual button 940. Also, the mobile device 900 displays a background 950 that can be displayed at least in part as the dominant color or the refined dominant color.

Figure 10:
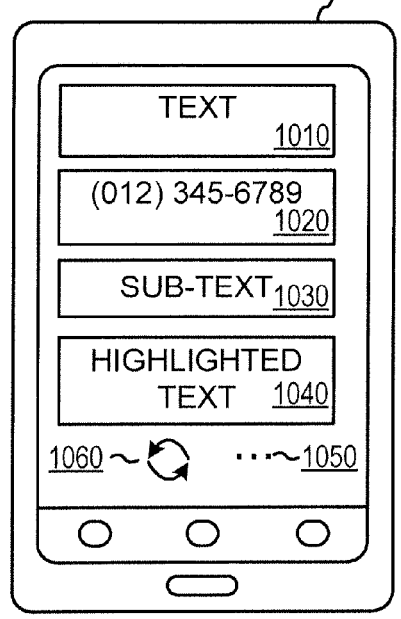
FIG. 10 is a diagram of an exemplary mobile device displaying exemplary visual elements of a mobile device operating system.

FIG. 10 is a diagram of an exemplary mobile device 1000 displaying various visual elements of a mobile device OS that can be set (e.g., via the mobile device OS settings) to be displayed using a dominant or refined dominant color determined from a photograph as described by any of the examples herein. In FIG. 10, the displayed visual elements of the mobile device OS can include text such as text 1010, one or more numbers such as the phone number 1020, sub-text such as sub-text 1030, one or more highlighted elements such as highlighted text 1040, one or more animations or icons such as animations 1050 and 1060.

Figure 11:
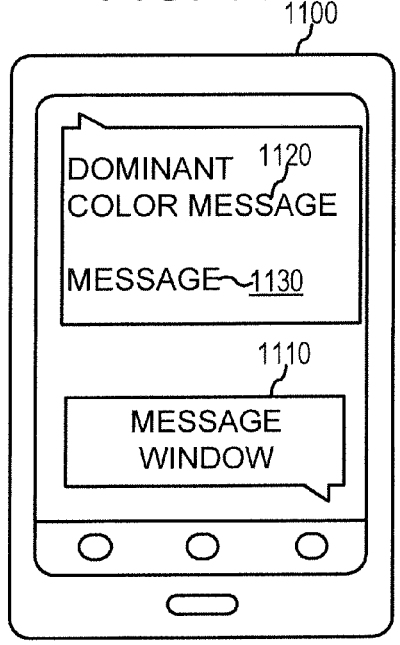
FIG. 11 is a diagram of an exemplary mobile device displaying exemplary visual elements of a mobile device operating system.

FIG. 11 is a diagram of an exemplary mobile device 1100 displaying various visual elements of a mobile device OS that can be set (e.g., via the mobile device OS settings) to be displayed using a dominant or refined dominant color determined from a photograph as described by any of the examples herein. In FIG. 11, the displayed visual elements of the mobile device OS can include one or more messaging windows such as messaging window 1110. Also, the mobile device can display text in a dominant color such as text 1120 along with text in another color such as text 1130.

Figure 12:
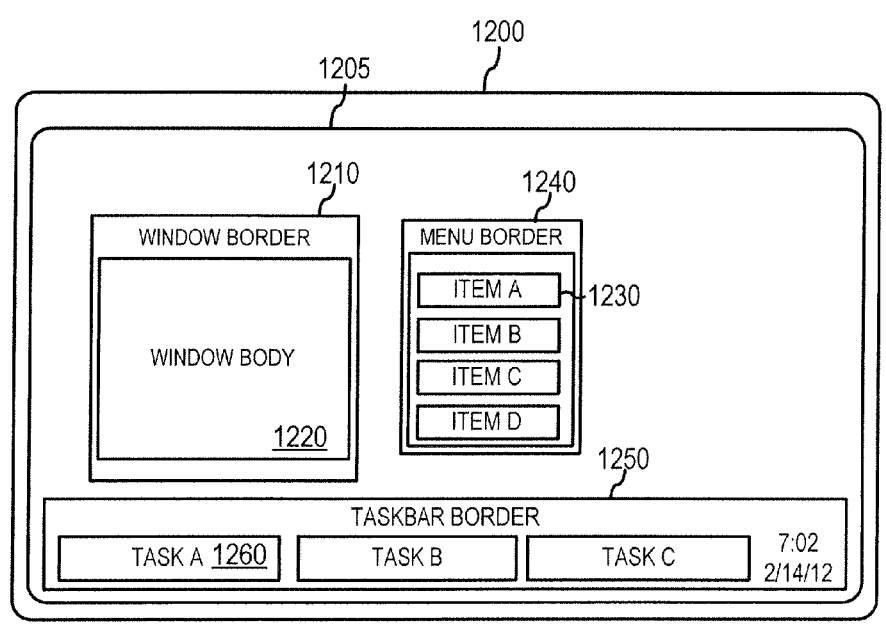
FIG. 12 is a diagram of an exemplary computing device displaying exemplary visual elements of an operating system.

FIG. 12 is a diagram of an exemplary computing device 1100 displaying, in display 1205, various visual elements of an OS that can be set (e.g., via the device OS settings) to be displayed using a dominant or refined dominant color determined from a photograph as described by any of the examples herein. In FIG. 12, the displayed visual elements of the OS can include elements of a window such as a window border 1210 or a window body 1220. Also the displayed visual elements of the OS can include elements of a menu such as a menu border 1240 and a menu item 1230 or elements of a taskbar such as task icon 1260 or a taskbar border 1250.

Exemplary Mobile Device

Figure 13:
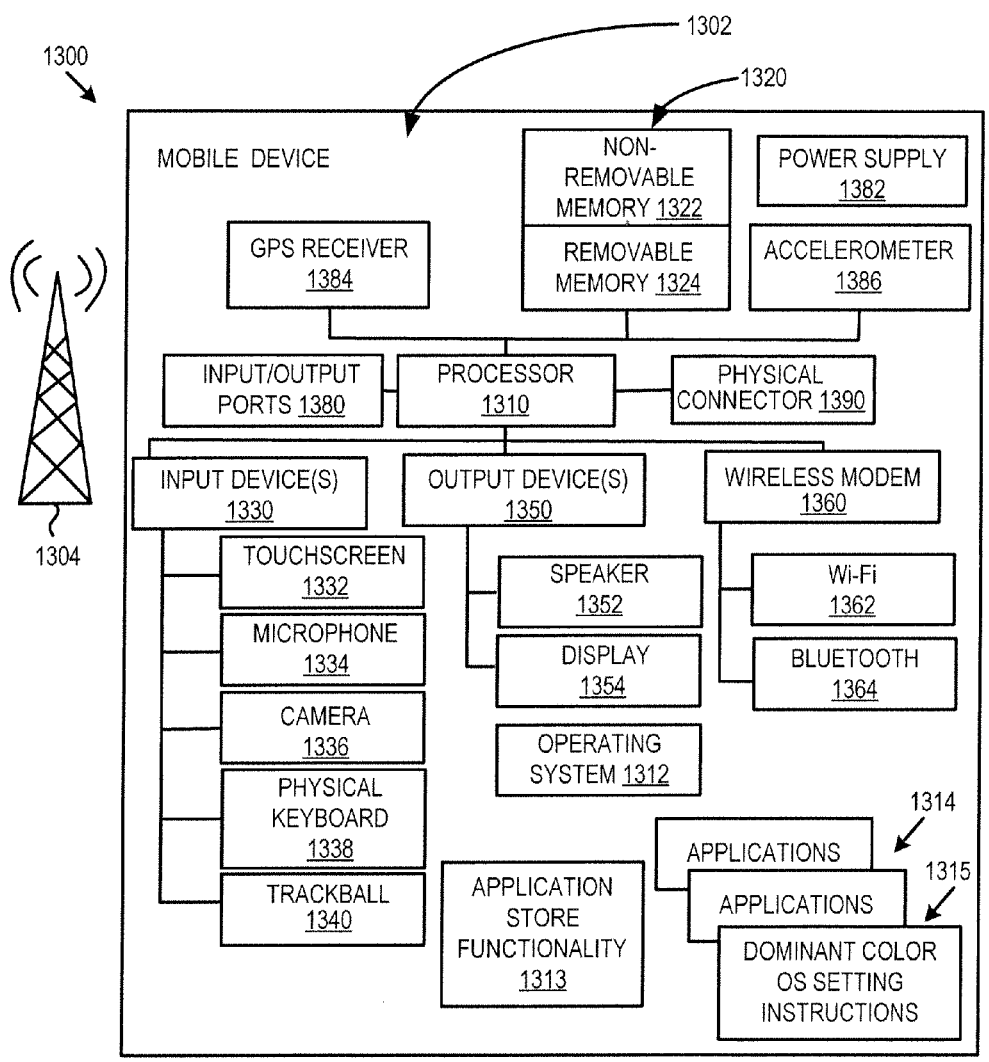
FIG. 13 is a schematic diagram depicting an exemplary mobile device with which any of the disclosed embodiments can be implemented.

FIG. 13 is a system diagram depicting an exemplary mobile device 1300 including a variety of optional hardware and software components, shown generally at 1302. Any components 1302 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 1304, such as a cellular or satellite network.

The illustrated mobile device 1300 can include a controller or processor 1310 (e.g., signal processor, microprocessor, ASIC, or other control and processing logic circuitry) for performing such tasks as signal coding, data processing, input/output processing, power control, and/or other functions. An operating system 1312 can control the allocation and usage of the components 1302 and support for one or more application programs 1314 and/or one or more operating system applications 1315 such as one that can implement one or more of the technologies described herein for setting a color setting of the operating system 1312. The application programs can include common mobile computing applications (e.g., email applications, calendars, contact managers, web browsers, messaging applications), or any other computing application. Functionality 1313 for accessing an application store can also be used for acquiring and updating application programs 1314.

The illustrated mobile device 1300 can include memory 1320. Memory 1320 can include non-removable memory 1322 and/or removable memory 1324. The non-removable memory 1322 can include RAM, ROM, flash memory, a hard disk, or other well-known memory storage technologies. The removable memory 1324 can include flash memory or a Subscriber Identity Module (SIM) card, which is well known in GSM communication systems, or other well-known memory storage technologies, such as "smart cards." The memory 1320 can be used for storing data and/or code for running the operating system 1312 and the applications 1314. Example data can include web pages, text, images, sound files, video data, or other data sets to be sent to and/or received from one or more network servers or other devices via one or more wired or wireless networks. The memory 1320 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1300 can support one or more input devices 1330, such as a touchscreen 1332, microphone 1334, camera 1336, physical keyboard 1338 and/or trackball 1340 and one or more output devices 1350, such as a speaker 1352 and a display 1354. Other possible output devices (not shown) can include piezoelectric or other haptic output devices. Some devices can serve more than one input/output function. For example, touchscreen 1332 and display 1354 can be combined in a single input/output device. The input devices 1330 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1312 or applications 1314 can comprise speech-recognition software as part of a voice user interface that allows a user to operate the device 1300 via voice commands. Further, the device 1300 can comprise input devices and software that allows for user interaction via a user's spatial gestures, such as detecting and interpreting gestures to provide input to a gaming application or other application.

A wireless modem 1360 can be coupled to an antenna (not shown) and can support two-way communications between the processor 1310 and external devices, as is well understood in the art. The modem 1360 is shown generically and can include a cellular modem for communicating with the mobile communication network 1304 and/or other radio-based modems (e.g., Bluetooth 1364 or Wi-Fi 1362). The wireless modem 1360 is typically configured for communication with one or more cellular networks, such as a GSM network for data and voice communications within a single cellular network, between cellular networks, or between the mobile device and a public switched telephone network (PSTN).

The mobile device can further include at least one input/output port 1380, a power supply 1382, a satellite navigation system receiver 1384, such as a Global Positioning System (GPS) receiver, an accelerometer 1386, and/or a physical connector 1390, which can be a USB port, IEEE 1394 (FireWire) port, and/or RS-232 port. The illustrated components 1302 are not required or all-inclusive, as any components can deleted and other components can be added.

Exemplary Implementation Environment

Figure 14:
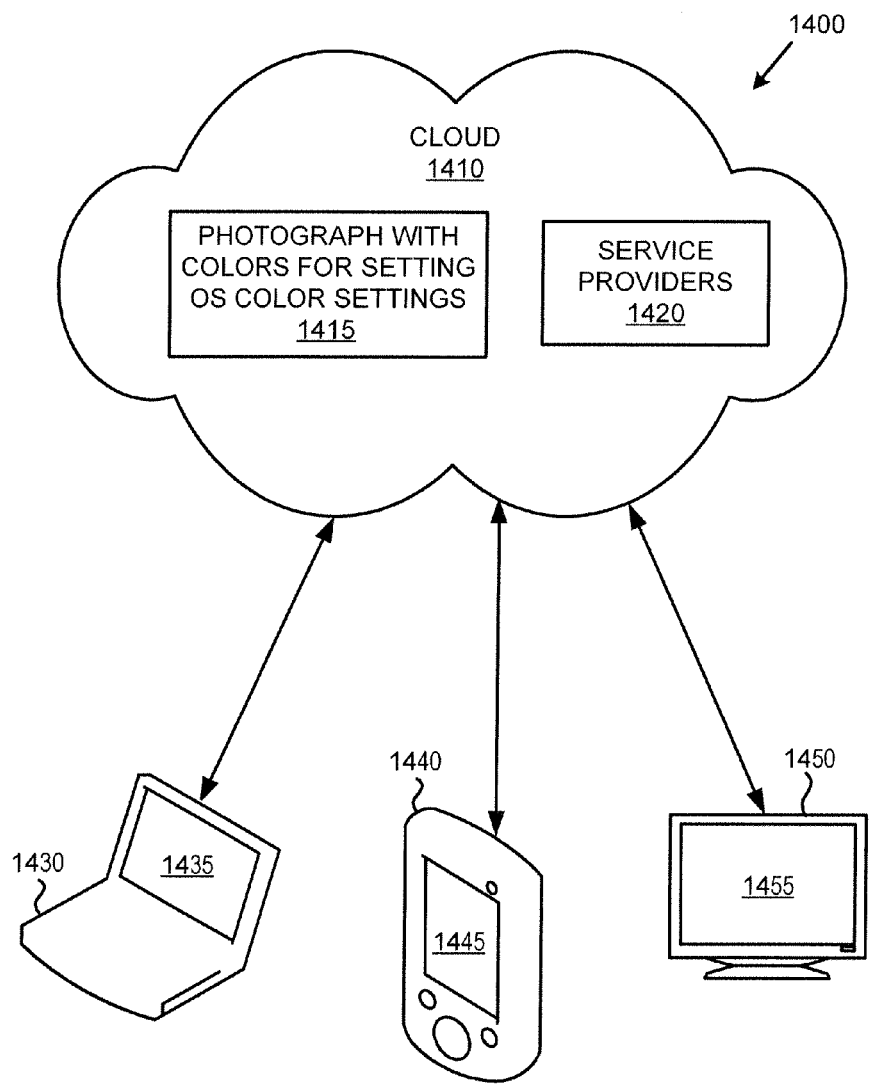
FIG. 14 is a schematic diagram illustrating a generalized example of a suitable implementation environment for any of the disclosed embodiments.

FIG. 14 illustrates a generalized example of a suitable implementation environment 1400 in which described embodiments, techniques, and technologies may be implemented.

In example environment 1400, various types of services (e.g., computing services) are provided by a cloud 1410. For example, the cloud 1410 can comprise a collection of computing devices, which may be located centrally or distributed, that provide cloud-based services to various types of users and devices connected via a network such as the Internet. The implementation environment 1400 can be used in different ways to accomplish computing tasks. For example, some tasks (e.g., processing user input and presenting a user interface) can be performed on local computing devices (e.g., connected devices 1430, 1440, 1450) while other tasks (e.g., storage of data to be used in subsequent processing) can be performed in the cloud 1410.

In example environment 1400, the cloud 1410 provides services for connected devices 1430, 1440, 1450 with a variety of screen capabilities. Connected device 1430 represents a device with a computer screen 1435 (e.g., a mid-size screen). For example, connected device 1430 could be a personal computer such as desktop computer, laptop, notebook, netbook, or the like. Connected device 1440 represents a device with a mobile device screen 1445 (e.g., a small size screen). For example, connected device 1440 could be a mobile phone, smart phone, personal digital assistant, tablet computer, or the like. Connected device 1450 represents a device with a large screen 1455. For example, connected device 1450 could be a television screen (e.g., a smart television) or another device connected to a television (e.g., a set-top box or gaming console) or the like. One or more of the connected devices 1430, 1440, and 1450 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1400. For example, the cloud 1410 can provide services for one or more computers (e.g., server computers) without displays.

Services can be provided by the cloud 1410 through service providers 1420, or through other providers of online services (not depicted). For example, cloud services can be customized to the screen size, display capability, and/or touchscreen capability of a particular connected device (e.g., connected devices 1430, 1440, 1450).

In example environment 1400, the cloud 1410 provides the technologies and solutions described herein to the various connected devices 1430, 1440, 1450 using, at least in part, the service providers 1420. For example, the service providers 1420 can provide a centralized solution for various cloud-based services. The service providers 1420 can manage service subscriptions for users and/or devices (e.g., for the connected devices 1430, 1440, 1450 and/or their respective users). The cloud 1410 can provide one or more photographs 1415 for determining colors for setting a color setting of an operating system.

Exemplary Computing Environment

Figure 15:
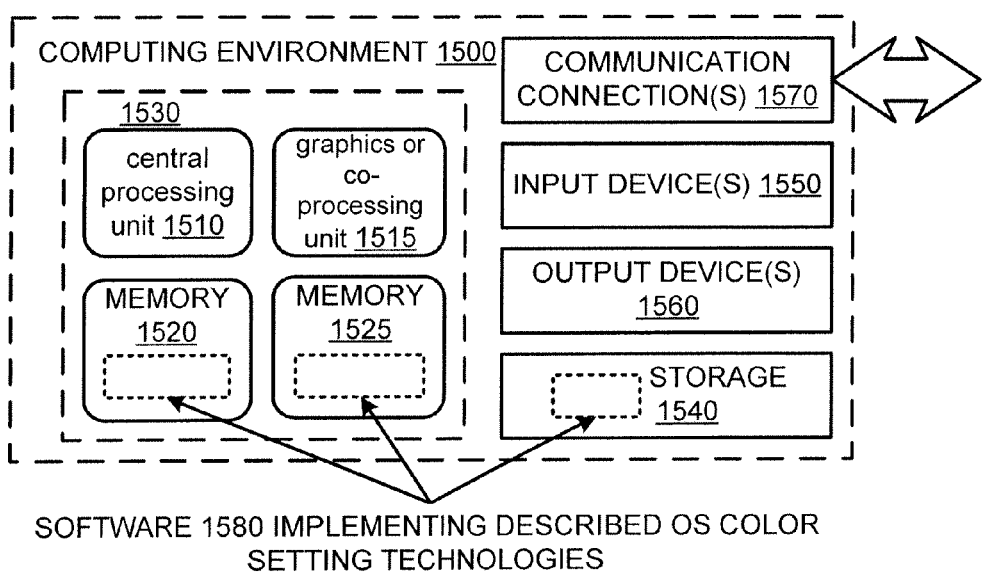
FIG. 15 is a schematic diagram illustrating a generalized example of a suitable computing environment for any of the disclosed embodiments.

FIG. 15 depicts a generalized example of a suitable computing environment 1500 in which the described innovations may be implemented. The computing environment 1500 is not intended to suggest any limitation as to scope of use or functionality, as the innovations may be implemented in diverse general-purpose or special-purpose computing systems. For example, the computing environment 1500 can be any of a variety of computing devices (e.g., desktop computer, laptop computer, server computer, tablet computer, media player, gaming system, mobile device, etc.)

With reference to FIG. 15, the computing environment 1500 includes one or more processing units 1510, 1515 and memory 1520, 1525. In FIG. 15, this basic configuration 1530 is included within a dashed line. The processing units 1510, 1515 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 15 shows a central processing unit 1510 as well as a graphics processing unit or co-processing unit 1515. The tangible memory 1520, 1525 may be volatile memory (e.g., registers, cache, RAM), nonvolatile memory (e.g., ROM, EEPROM, flash memory, etc.), or some combination of the two, accessible by the processing unit(s). The memory 1520, 1525 stores software 1580 implementing one or more innovations described herein, in the form of computer-executable instructions suitable for execution by the processing unit(s).

A computing system may have additional features. For example, the computing environment 1500 includes storage 1540, one or more input devices 1550, one or more output devices 1560, and one or more communication connections 1570. An interconnection mechanism (not shown) such as a bus, controller, or network interconnects the components of the computing environment 1500. Typically, operating system software (not shown) provides an operating environment for other software executing in the computing environment 1500, and coordinates activities of the components of the computing environment 1500.

The tangible storage 1540 may be removable or non-removable, and includes magnetic disks, magnetic tapes or cassettes, CD-ROMs, DVDs, or any other medium which can be used to store information in a non-transitory way and which can be accessed within the computing environment 1500. The storage 1540 stores instructions for the software 1580 implementing one or more innovations described herein such as using a photograph to determine a color for setting a color setting of an operating system.

The input device(s) 1550 may be a touch input device such as a keyboard, mouse, pen, or trackball, a voice input device, a scanning device, or another device that provides input to the computing environment 1500. For video encoding, the input device(s) 1550 may be a camera, video card, TV tuner card, or similar device that accepts video input in analog or digital form, or a CD-ROM or CD-RW that reads video samples into the computing environment 1500. The output device(s) 1560 may be a display, printer, speaker, CD-writer, or another device that provides output from the computing environment 1500.

The communication connection(s) 1570 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). As should be readily understood, the term computer-readable storage media does not include communication connections, such as modulated data signals. Any of the computer-executable instructions for implementing the disclosed techniques as well as any data created and used during implementation of the disclosed embodiments can be stored on one or more computer-readable media (e.g., non-transitory computer-readable media, which excludes propagated signals). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionally described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims and their equivalents.

We claim:

1. A method implemented at least in part using a computing device, the method comprising:
    receiving a photograph;
    determining one or more pixel weights for one or more pixels of the photograph using a measured distance from a location in the photograph;
    using at least one of the one or more pixel weights, determining at least one dominant color of the photograph; and
    using the at least one dominant color, setting at least one color setting of an operating system.

2. The method of claim 1, wherein the one or more color settings of the operating system comprise a theme color setting or an accent color setting, and the method further comprises applying the theme or accent color to at least a border of a window or a background color.

3. The method of claim 1, determining a pixel-weight total for a color-range bin, the pixel-weight total comprising a sum of one or more pixel weights of one or more pixels of the photograph that are a color within the color-range bin; and
    determining that the pixel-weight total for the color-range bin is greater than one or more pixel-weight totals of one or more other color-range bins.

4. The method of claim 1, wherein determining the at least one dominant color comprises:
    selecting a dominant color-range bin from a plurality of color-range bins; and
    using at least one or more pixels with colors within the dominant color-range bin, generating the at least one dominant color.

5. The method of claim 4, wherein generating the dominant color comprises determining at least one average color value using at least one of the color values of the one or more pixels with color values within the dominant color-range bin.

6. The method of claim 4, wherein selecting the dominant color-range bin comprises determining that the pixel-weight total for the color-range bin has a higher pixel-weight total than the one or more other color-range bins.

7. The method of claim 4, wherein the generating the at least one dominant color further comprises using at least one or more pixels with color values within one or more color-range bins that neighbor the dominant color-range bin.

8. The method of claim 4 further comprising determining a second dominant color at least by determining a second dominant color-range bin.

9. The method of claim 1, wherein the setting the one or more color settings of an operating system comprises changing a luminance of the at least one dominant color.

10. The method of claim 1, wherein the receiving the photograph comprises receiving a user selection of the photograph or receiving a user selection to take the photograph with a camera.

11. The method of claim 1, wherein the location in the photograph is a user-selected location.

12. The method of claim 1 further comprising downsampling the photograph.

13. The method of claim 1, wherein the setting the one or more color settings of the operating system comprises modifying the at least one dominant color.

14. A computing device that includes a processor and memory, the memory storing computer-executable instructions for causing the computing device to perform a method, the method comprising:
    receiving one or more color values from a photograph provided outside of an operating system;
    determining a dominant color-range bin of a partitioned color space;
    determining at least one neighboring color-range bin of the dominant color-range bin, wherein the dominant color-range bin and the at least one neighboring color-range bin are divisions of a color space;
    determining at least one dominant color of the photograph at least using a color within the dominant color-range bin and a color within the at least one neighboring color-range bin; and
    using the at least one dominant color, setting at least one color setting of the operating system.

15. The computing device of claim 14, wherein the using the at least one dominant color comprises producing a refined dominant color; and
    based on the setting of the at least one color setting, displaying at least one visual element of the operating system using at least the refined dominant color.

16. The computing device of claim 14, wherein the using the at least one dominant color comprises producing a refined dominant color at least by changing a luminance of the dominant color.

17. The computing device of claim 16, wherein the refined dominant color has a contrast ratio within a predetermined contrast ratio range.

18. The computing device of claim 16, wherein the determining of the dominant color of the photograph further comprises taking an average of at least the color within the dominant color-range bin and the color within the at least one neighboring color-range bin.

19. One or more computer-readable storage media storing computer-executable instructions for causing a computing device to perform a method, the method comprising:
    displaying a color settings screen of an operating system;
    displaying a photograph selection option;
    receiving a photograph;
    determining one or more pixel weights for one or more pixels of the photograph, at least in part by using a distance of the one or more pixels from a point in the photograph;
    determining at least one dominant color of the photograph;
    modifying a luminance of the at least one dominant color to produce at least one refined dominant color;
    setting one or more color settings of the operating system to the at least one refined dominant color; and
    based at least on the setting the one or more color settings, displaying at least one visual element of the operating system using the at least one refined dominant color.

* * * * *